(12) United States Patent
Chang

(10) Patent No.: US 7,394,736 B2
(45) Date of Patent: Jul. 1, 2008

(54) DYNAMIC SPEED CONTROL METHOD FOR STORAGE DEVICE

(75) Inventor: Kun-Chang Chang, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 150 days.

(21) Appl. No.: 11/330,488

(22) Filed: Jan. 12, 2006

(65) Prior Publication Data

US 2006/0212779 A1    Sep. 21, 2006

(30) Foreign Application Priority Data

Mar. 11, 2005  (TW)  .............................. 94107509 A

(51) Int. Cl.
*G11B 17/00* (2006.01)
*G11B 5/09* (2006.01)

(52) U.S. Cl. ................. 369/47.36; 369/47.45; 369/53.3; 369/53.43; 360/73.01

(58) Field of Classification Search .............. 369/47.36, 369/47.38, 47.45, 53.3, 275.1, 275.4, 53.36; 360/73.01; 714/767
See application file for complete search history.

(56) References Cited

U.S. PATENT DOCUMENTS

| | | | |
|---|---|---|---|
| 4,604,748 A * | 8/1986 | Sato ............................ | 714/704 |
| 4,868,819 A | 9/1989 | Kimura | |
| 5,636,196 A | 6/1997 | Kumagai | |
| 6,009,053 A | 12/1999 | Ota et al. | |
| 6,043,946 A * | 3/2000 | Genheimer et al. ........... | 360/53 |
| 6,122,131 A * | 9/2000 | Jeppson .................... | 360/77.02 |
| 6,137,757 A | 10/2000 | Kinoshita | |
| 6,216,245 B1 * | 4/2001 | Noda .......................... | 714/755 |
| 6,587,411 B2 | 7/2003 | Hayashi | |
| 6,628,595 B1 | 9/2003 | Sasa et al. | |
| 6,795,387 B2 * | 9/2004 | Chang ........................ | 369/53.3 |
| 6,977,878 B2 * | 12/2005 | Lee et al. .................. | 369/47.38 |
| 6,986,095 B2 * | 1/2006 | Maeda et al. ................ | 714/769 |
| 7,085,429 B2 * | 8/2006 | Sasa ........................... | 382/272 |
| 7,263,043 B2 * | 8/2007 | Watanabe et al. .......... | 369/47.5 |
| 7,281,175 B1 * | 10/2007 | Hayashi et al. ............. | 714/704 |
| 7,305,606 B2 * | 12/2007 | Hoshizawa et al. ......... | 714/755 |
| 2002/0024902 A1 * | 2/2002 | Sasaki ..................... | 369/47.39 |
| 2002/0041548 A1 * | 4/2002 | Ikeda et al. .............. | 369/47.41 |
| 2002/0080699 A1 * | 6/2002 | Joung ...................... | 369/53.18 |
| 2002/0118619 A1 * | 8/2002 | Tomishima .............. | 369/53.14 |
| 2004/0193999 A1 * | 9/2004 | Fukuda ........................ | 714/763 |
| 2004/0246843 A1 * | 12/2004 | Chang ..................... | 369/47.36 |
| 2006/0072444 A1 * | 4/2006 | Engel et al. .............. | 369/275.1 |

* cited by examiner

*Primary Examiner*—Hoa T. Nguyen
*Assistant Examiner*—Dismery Mercedes
(74) *Attorney, Agent, or Firm*—Thomas, Kayden, Horstemeyer & Risley

(57) ABSTRACT

A method is disclosed for adjusting the rotational speed of a disk drive. According to the method, the proportion of time which the disc drive is reading data from the disc during a unit time T is calculated. Then, the increase of the rotational speed of the motor is avoided if the error rate $E_k$ that a disc drive reads data during each of r consecutive units of time periods T is not less than a criterion Q. Otherwise, the rotational speed of the motor of the disc drive is increased if the proportion of time $P_k$ that the disc drive spends reading data from the disc is greater than a threshold H during each of m consecutive units of time period T, and the rotational speed of the motor of the disc drive is decreased if the $P_k$ is less than a threshold L during each of n consecutive units of time periods T.

15 Claims, 4 Drawing Sheets

DYNAMIC SPEED CONTROL METHOD FOR STORAGE DEVICE

BACKGROUND OF THE INVENTION

1. Field of the Invention

The present invention pertains to a method that dynamically adjusts the rotational speed of a motor of a disk drive according to the data transfer rate from the computer system and the data error rate while reading data.

2. Description of the Prior Art

The increase in the operating speed of personal computers (PCs) has been accompanied by improvements in the transfer speed and capacity of peripheral devices. Under these circumstances, computer storage media have also become multifunctional, instead of simply functioning as a means for the storage of information. For example, the contents of a CD-ROM disk can be music, data, or video. However, different applications may have large differences in the transfer rate between the optical disk drive and the PC. For example, when a VCD movie is playing, the transfer rate is only 176 Kbyte/sec, that is, the so-called unit speed. On the other hand, the transfer rate of a document file can exceed 10 Mbyte/sec, an order of magnitudes.

In order to ensure that motor-driven disk drives, such as for CD-ROMs, magnetic disks, or hard disks, can provide the transfer rate required by the computer, the motor is usually set to a rotational speed that is much higher than necessary. Thus, in conventional disk drives, it is very common for the motor to rotate the disk at a very high speed even when the transfer rate required by the computer is fairly low. This results not only in inefficient power consumption, but also in noise, vibration, and degradation in reading quality when the motor rotates at high speeds. In addition, reading data at too high a speed may also result in the deterioration in performance of the disk drive.

Therefore, as described above, conventional high-speed disk drives typically read data from disks at a set (i.e., fixed) and relatively high rotational speed. Regarding the setting of the motor speed of the disk drive, the difficulty is how to calculate the transfer rate required by the computer system. Since the transfer rate between the computer system and the disk drive is affected by the time that the disk drive itself spends reading data, one cannot simply assume that the amount of data transferred per unit time is the transfer rate.

SUMMARY OF THE DISCLOSURE

It is an object of the present invention to provide a disc drive and method that avoids inefficient power consumption, noise, and vibration generated by a disc drive motor that rotates at unnecessarily high speeds.

It is another object of the present invention to provide a disc drive and method that maintains the motor speed at an efficient level.

It is yet another object of the present invention to provide a disc drive and method whose motor speed is dynamically adjusted in accordance with the change in the transfer rate required by the computer system and the error rate when reading data.

In order to accomplish the objects of the present invention, the present invention provides a method for adjusting the rotational speed of a disc drive. According to the method, the proportion of time which the disc drive is reading data from the disc during a unit time T is calculated. Then, the increase of the rotational speed of the motor is avoided if the error rate $E_k$ that a disc drive reads data during each of r consecutive units of time periods T is not less than a criterion Q. Otherwise, the rotational speed of the motor of the disc drive is increased if the proportion of time $P_k$ that the disc drive spends reading data from the disc is greater than a threshold H during each of m consecutive units of time period T, and the rotational speed of the motor of the disc drive is decreased if the $P_k$ is less than a threshold L during each of n consecutive units of time periods T.

Moreover, H can be 90%, and L can be 50% in one non-limiting example. And Q is 100 PI (Parity of Inner Code) errors.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
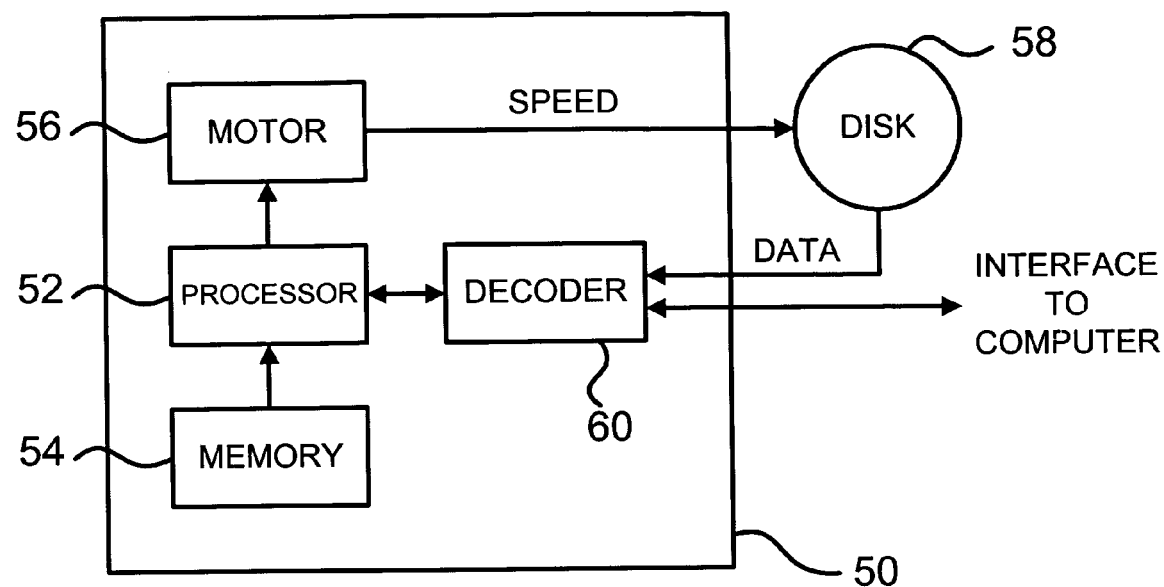
FIG. 1 is a simple block diagram illustrating the primary function blocks in a disk drive.

FIG. 1 is a simple block diagram illustrating the primary function blocks in a disk drive. A disk drive 50 has a processor 52, a memory 54, and a motor 56. The processor 52 couples to the memory 54 to access the software and the related settings stored in the memory 54. And the processor 52 further controls the reading speed by controlling the rotation of the motor 56 that drives the disk 58. The disk drive 50 further includes a decoder 60 that transmits the data read from the disk 58 to the processor 52 and can couple to an interface to connect the disk drive 50 and the computer system or other devices. The settings stored in the memory 54 include the parameters such as T, H, L, m, n and Q. The functions and purposes of these parameters will be illustrated in the following embodiments.

The present invention adopts a few assumptions in its method for adjusting the motor speed of a disk drive 50. Instead of setting the motor speed by directly calculating the amount of data transfer between the computer system and the disk drive 50, a method based on relative speed is used to determine whether to increase or decrease the motor speed. The assumptions are as follows:

(1) If a disk drive 50 only spends a small amount of time during a given time period reading data from a disk 58, it means that the reading speed of the disk drive 50 is higher than that required by the computer system, and therefore the disk drive 50 need only spending a small portion of the time reading from the disk 58 to satisfy the required amount of data transfer, In this case, the motor speed should be decreased.

(2) On the other hand, if during most of that given period of time, the disk drive 50 is reading data from the disk 58, and then the reading speed of the disk drive 50 is less than that required by the computer system. In that case, the motor speed should be increased.

For example, the disk drive 50 can first process tasks in the main loop. After a predetermined period of time T, the proportion of time that the disk drive 50 spent reading data from the disk 58 is calculated, and the proportions of the data reading times in the previous m or n units of time periods T are also checked. If, during each previous m units of time periods T, the proportion of time that the disk drive 50 spends reading data from the disk 58 is greater than the threshold H for increasing the rotational speed, then the rotational speed of the motor 56 is increased. On the other hand, if, during each previous n units of time T, the proportion of time that the disk drive 50 spends reading data from the disk 58 is less than the threshold L for decreasing the rotational speed, then the rotational speed of the motor 56 is decreased. In one non-limiting example, H can be 90%, and L can he 50%.

Figure 2:
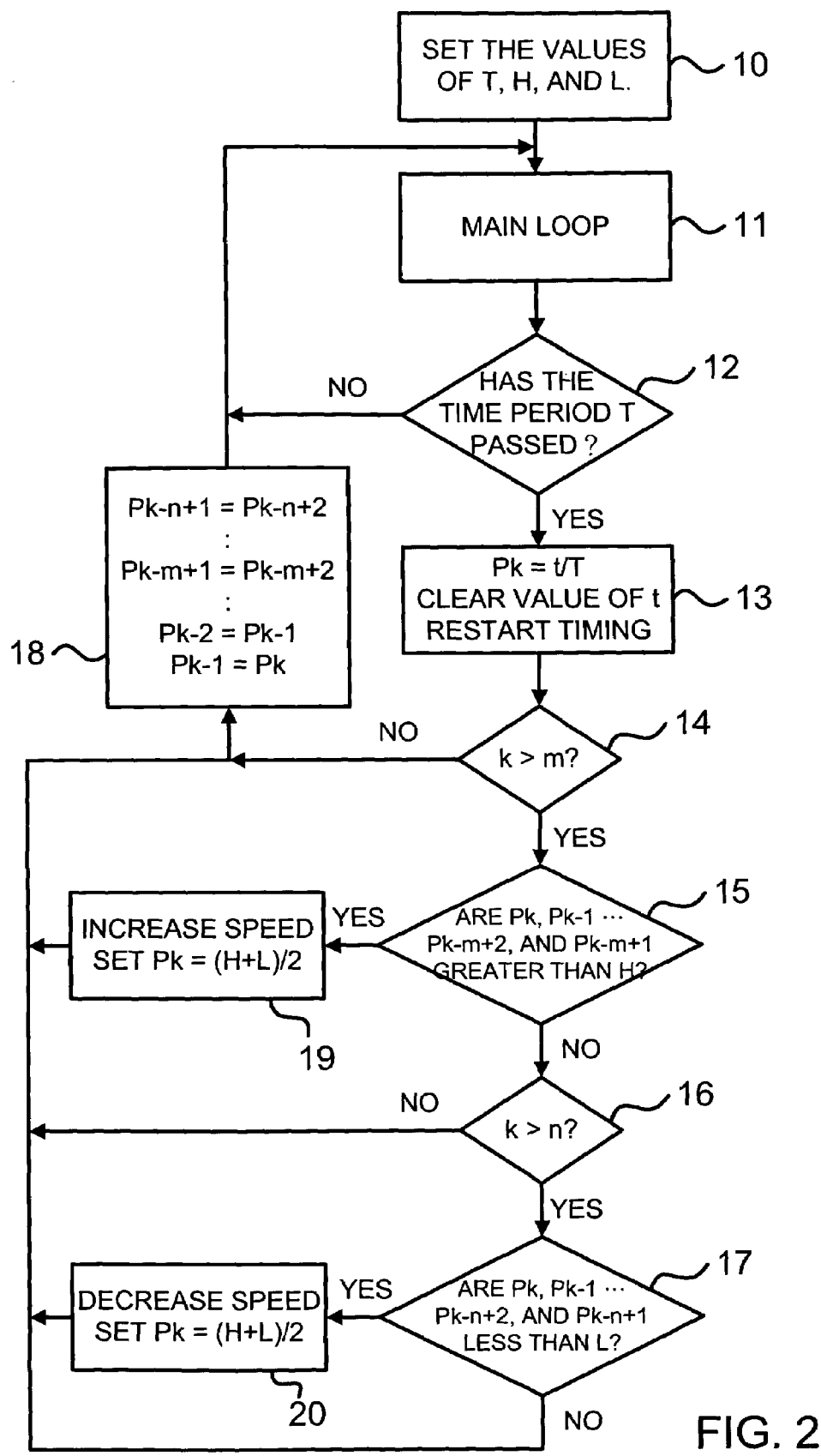
FIG. 2 is a flowchart of the first embodiment of the present invention for controlling the increase or decrease of the rotational speed.

FIG. 2 is a flowchart that illustrates the method according to the first embodiment of the present invention. Under the assumption that n is not less than m, the method includes the following steps:

Step 10: In this step, the values of T, H, and L are preset and the timing is started. Here, T is a constant time period, and H and L are the thresholds for determining whether to increase or decrease the rotational speed.

Step 11: In this step, the disk drive 50 performs its given tasks in the main loop, such as executing commands issued by the computer. Process proceeds to step 12.

Step 12: In this step, it is determined whether the time period T has passed. If yes, process proceeds to step 13. If no, process returns to step 11.

Step 13: In this step, Pk=t/T is calculated, value of t is cleared, and the timing is restarted. Here, t is the time that the disk drive 50 spends reading data from the disk 58 during a unit time T. Pk is the kth record of the proportion of time that the disk drive 50 spends reading data from the disk 58 during a unit time T. Process proceeds to step 14.

Step 14: In this step, it is determined whether k is greater than m. If yes, this means that at least m units of time period T have passed, and process proceeds to step 15. If no, this means that fewer than m units of time period T have passed, and process proceeds to step 18.

Step 15: In this step, it is determined whether each of Pk, Pk-1 . . . Pk-m+2, and Pk-m+1 is greater than H. If the proportion of time that the disk drive 50 spends reading data from the disk 58 is greater than H during each of m consecutive units of time period T, process proceeds to step 19 to increase the rotational speed. If no, then process proceeds to step 16.

Step 16: In this step, it is determined whether k is greater than n. If yes, this means that at least n units of time period T have passed, and process proceeds to step 17. If no, this means that fewer than m units of time period T have passed, and process proceeds to step 18.

Step 17: In this step, it is determined whether each of Pk, Pk-1 . . . Pk-n+2 and Pk-n+1 is less than L. If yes, this means that the proportion of time that the disk drive 50 spends reading data from the disk 58 during each of n consecutive units of time period T is less than L, and process proceeds to step 20 to decrease the rotational speed. If no, process proceeds to step 18.

Step 18: The values of Pk-1 . . . Pk-n+1 are updated by shifting the values of Pk-1, . . ., Pk-n+1. For example, Pk-n+1=the current Pk-n+2; . . . Pk-m+1=the current Pk-m+2; . . . Pk-2=the current Pk-1; Pk-1=the current Pk are set, and process returns to step 11. This shifting allows for the new Pk to be calculated.

Step 19: In this step, the rotational speed is increased by the processor 52. The speed can be increased by using a number of different techniques, depending on the desired parameters and applications. For example, each incremental speed increase can be the same. As another example, a table (stored in the memory 54) can be used to store a number of pre-set increases, such as (but not limited to) 1000, 2000, 4000, 6000 rpm, etc. Thus, the first increase might be by 1000 rpm, the second increase would be by 2000 rpm, and then the next increase would be by 4000 rpm, and so on. If such a technique is implemented, then any subsequent decreases (see step 20) would have to follow the same progression, so that if the most recent speed increase was by 6000 rpm, then a subsequent speed decrease would also be by 6000 rpm, then the next speed decrease would be by 4000 rpm, and so on. Then, Pk=(H+L)/2 is set so as to set Pk to a value between H and L to prevent another immediate increase or decrease when the next Pk is calculated in step 13. Process proceeds to step 18.

Step 20: In this step, the rotational speed is decreased by using principles similar to those explained above in connection with step 19. Then Pk=(H+L)/2 is set (for the same reason as for step 19 above), and then process proceeds to step 18.

As an alternative, steps 16 and 17 can be performed before steps 14 and 15 because these two procedures are independent of each other.

In addition, m and n can be adjusted to optimize the performance. For example, if m and n are increased to obtain a more stable speed change, this will also carry with it an increase in the response time (i.e., more time is required to achieve the required speed). On the other hand, if m and n are decreased to have a quick response, this will also carry with it an overburdened speed change.

Figure 3:
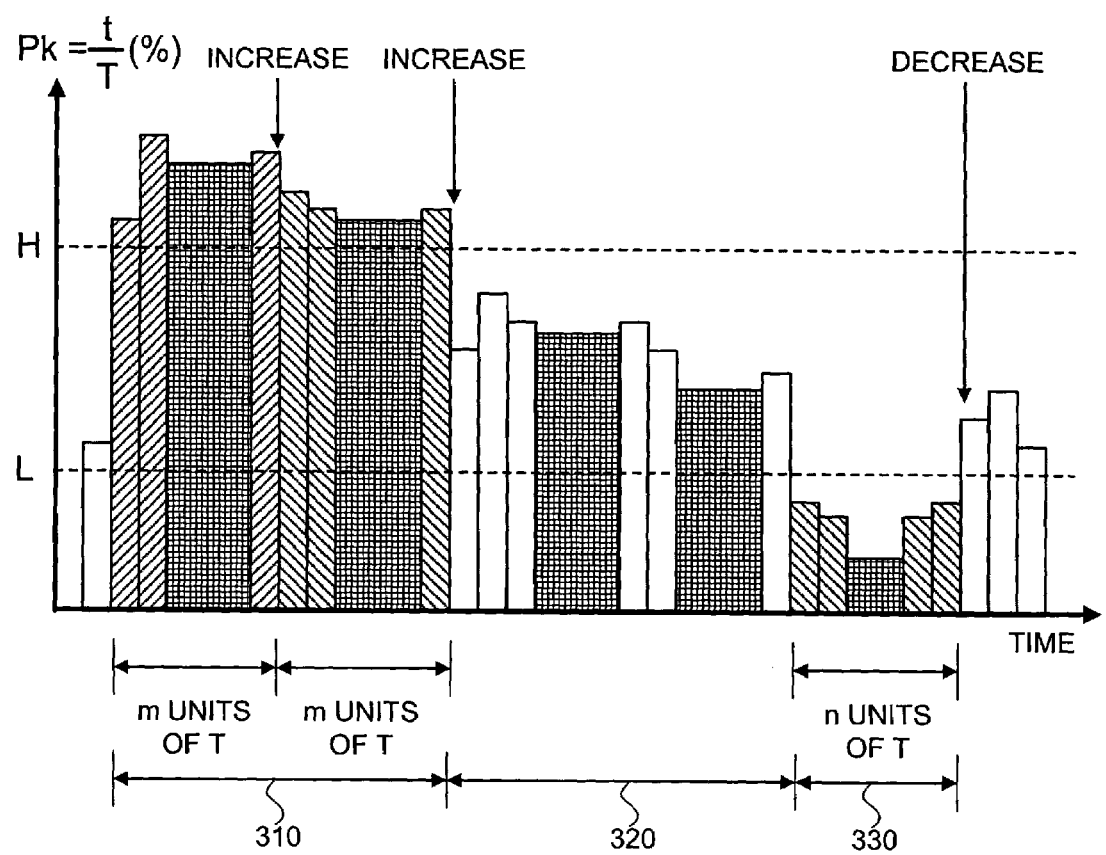
FIG. 3 is a chart that illustrates the relationship between $P_k$ (i.e., the proportion of the time during which the disk drive reads data from the disk during unit time T) and the time according to the present invention.

According to the aforementioned method and as illustrated in FIG. 3, if the disk drive 50 constantly reads data from the disk 58 for most of a given time period, this indicates that the disk drive 50 is being overburdened, and the reading speed is less than that required by the computer system. Therefore, the rotational speed of the motor 56 should be increased to obtain a higher data transfer rate to meet that required by the computer system. On the other hand, if the disk drive 50 reads data from the disk 58 for only a small part of a given time period, it indicates that the data transfer rate at the present rotational speed is much greater than that required by the computer system. Thus, the rotational speed of the motor 56 should be decreased, and the motor 56 should be controlled to work at a more efficient rotational speed that is sufficient for the transfer rate required by the computer system. For example, FIG. 3 illustrates that the rotational speed is increased when Pk exceeds H for m units of time periods T during the period 310. During the period 320, Pk is between the H and L values, so no changes in the data transfer rate required by the computer system. Then, the rotational speed is decreased when Pk is less than L for n units of time periods T during the period 330.

Moreover, the data recorded on the disk 58 are usually encoded according to an error correction code scheme to overcome problems such as the variation in write quality and the vibration of the disk 58 caused by its eccentricity or unbalance when it is being accessed by the disk drive 50. Then the correct data could be obtained by utilizing of the decoder 60 when reading. Generally, the amount of errors while decoding the encoded raw data read back from the disk 58 is increased with the increasing of the rotational speed of the motor 56. When the amount of the errors exceeds a criterion, the decoder 60 may not be able to decode the data from the disk 58 smoothly. Thus, it is better not to further increase the rotational speed of the motor 56 if the amount of errors is too high.

Figure 4:
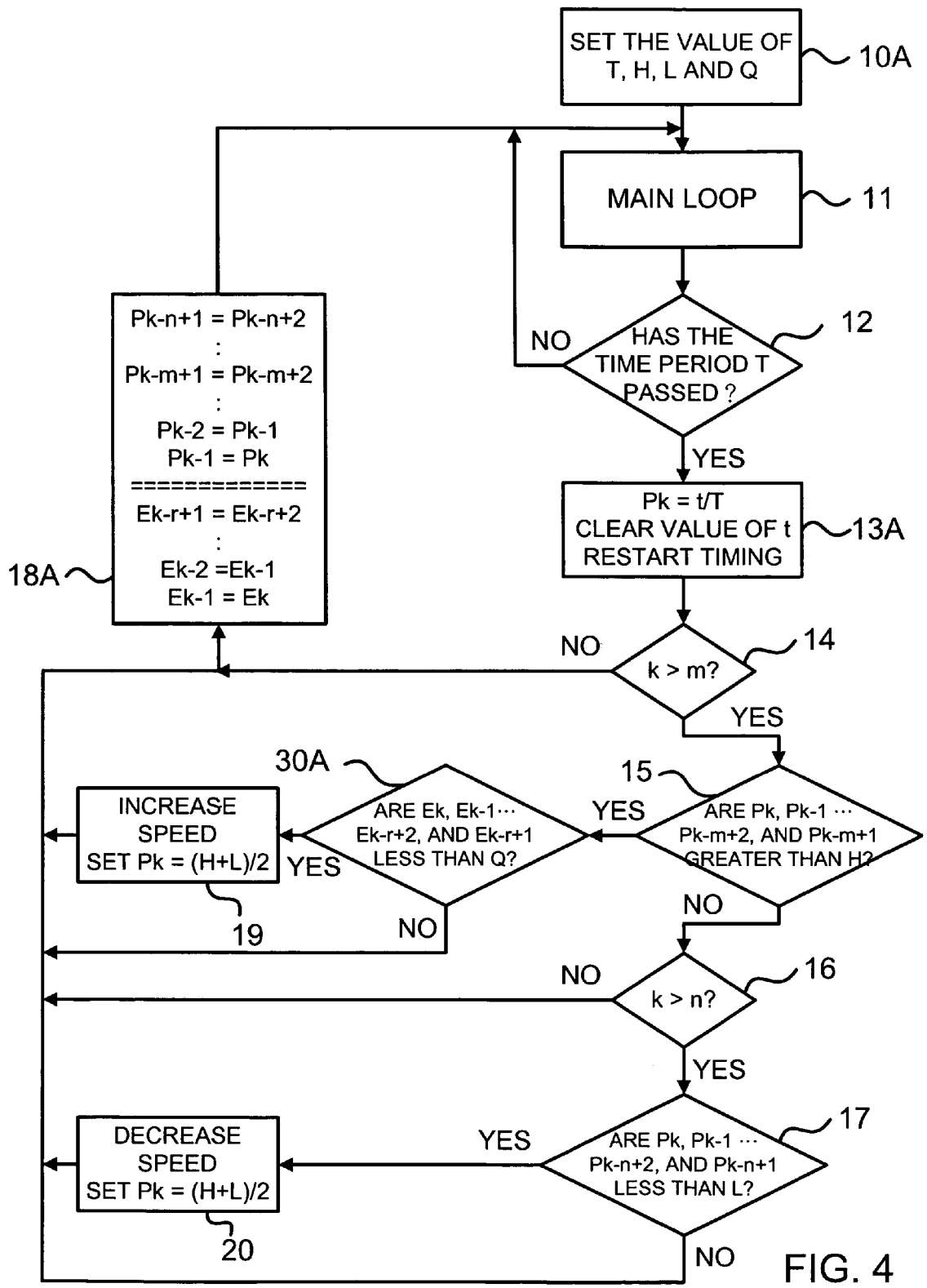
FIG. 4 is a flowchart of the second embodiment of the present invention for controlling the increase or decrease of the rotational speed.

For example, FIG. 4 is a flowchart a flowchart of the second embodiment of the present invention for controlling the increase or decrease of the rotational speed. Here, the error rate of read data is further checked to avoid the increase of the rotational speed due to the high error rate when reading data. Thus the error rate will not get worse with a higher rotational speed. For a better explanation of the embodiment, steps similar to those in the first embodiment as shown in FIG. 2 share the same numberings. Also under the assumption that n is not less than m, the method includes the following steps:

Step 10A: The values of T, H, L, and Q are preset and the timing is started. Here, T is a constant time period, and H and L are the thresholds for determine whether to increase or decrease the rotational speed. Q is the criterion for determining whether to prohibit the increasing of the rotational speed.

Step 11: In this step, the disk drive 50 is perform its given task in the main loop, such as executing commands issued by the computer. Process proceeds to step 12.

Step 12: In this step, it is determined whether the time period T has passed. If yes, process proceeds to step 13A. If no, process returns to step 11.

Step 13A: In this step, Pk=t/T and Ek are calculated, value of t is cleared, and the timing is restarted. Here, t is the time that the disk drive 50 spends reading data from the disk 58 during a unit time T. Pk is the kth record of the proportion of time which the disk drive 50 spends reading data from the disk 58 during a unit time T, and Ek is the error rate that the disk drive 50 reads data from the disk 58 during a unit time T. For example, to read a DVD disk, Ek could be the average amount of PI errors determined in every 42 error correction code blocks (ECC Blocks) during a unit time T. Process proceeds to step 14.

Step 14: In this step, it is determined whether k is greater than m. If yes, this means that at least m units of time period T have passed, and process proceeds to step 15. If no, this means that fewer than m units of time period T have passed, and process proceeds to step 18A.

Step 15: In this step, it is determined whether each of Pk, Pk-1 . . . Pk-m+2, and Pk-m+1 is greater than H. If yes, this means the proportion of time that the disk drive 50 spends reading data from the disk 58 is greater than H during each of m consecutive units of time period T, and the process proceeds to step 30A to determine whether to increase the rotational speed. If no, then process proceeds to step 16.

Step 30A: In this step, it is determined whether each of Ek, Ek-1 . . . Ek-r+2, and Ek-r+1 is less than Q. If yes, it means the error rate when the disk drive 50 reads data during each of r consecutive units of time periods T is less than Q. For example, while reading a DVD disk, Q could be set as 100 PI errors. If the average amount of the PI errors is less than 100 during each of r consecutive units of time periods T, and process proceeds to step 19 to increase the rotational speed. If no, do not increase the rotational speed, and process directly proceeds to step 18A.

Step 16: In this step, it is determined whether k is greater than n. If yes, this means that at least n units of time period T have passed, and process proceeds to step 17. If no, this means that fewer than m units of time period T have passed, and process proceeds to step 18A.

Step 17: In this step, it is determined whether each of Pk, Pk-1 . . . Pk-n+2, and Pk-n+1 is less than L. If yes, this means that the proportion of time that the disk drive 50 spends reading data from the disk 58 during each of n consecutive units of time period T is less than L, and process proceeds to step 20 to decrease the rotational speed. If no, directly process proceeds to step 18.

Step 18A: The values of Pk-1 . . . Pk-n+1 and Ek-1 . . . Ek-r+1 are updated by shifting the values of Pk-1 . . ., Pk-n+1. For example, Pk-n+1=the current Pk-n+2; . . . Pk-m+1=the current Pk-m+2; . . . Pk-2=the current Pk-1; Pk-1=the current Pk are set, Ek-r+1=the current Ek-r+2; . . . Ek-2=the current Ek-1; Ek-1=the current Ek are set, and process returns to step 11. This shifting allows for the new Pk and Ek to be calculated.

Step 19: In this step, the rotational speed is decreased by using principles similar to step 19 explained in the first embodiment. Then, Pk=(H+L)/2 is set so as to set Pk to a value between H and L to prevent another immediate increase or decrease when the next Pk is calculated in step 13A. Then process proceeds to step 18A.

Step 20: In this step, the rotational speed is decreased by using principles similar to step 20 explained in the first embodiment. Then Pk=(H+L)/2 is set (for the same reason as for step 19 above), and then process proceeds to step 18A.

Similar to the first embodiment mentioned above, since steps 16 and 17 and steps 14 and 15 are independent of each other, the sequence of these two groups of functionalities can be exchanged. And m, n, and r can be adjusted as well to optimize the performance.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method for adjusting the rotational speed of a motor of a disk drive, said method comprising steps:
   calculating an error rate Ek that said disk drive reads data from a disk during a unit time T; and
   avoiding the increase of the rotational speed when each of said error rate Ek, Ek-1, . . ., Ek-r+2, and Ek-r+1 is no less than a threshold Q during each of r consecutive units of time periods T,
   wherein said error rate Ek is the average amount of Parity of Inner Code (PI) errors in every 42 error correction code blocks during said unit time T.

2. The method of claim 1, wherein said threshold Q is 100 PI errors.

3. The method of claim 1, further comprising steps:
   calculating which said disk drive spends reading data from said disk during unit time T; and
   increasing said rotational speed of said disk drive when each of Pk, Pk-1 . . . Pk-m+2, and Pk-m+1 is greater than a threshold H during m consecutive units of time periods T and each of said error rate Ek, Ek-1, . . ., Ek-r+2, and Ek-r+1 is less than a criterion Q during each of r consecutive units of time periods T.

4. The method of claim 3, wherein said method further comprising a step of setting Pk to be less than said threshold H after increasing said rotational speed.

5. The method of claim 3, wherein said threshold H is 90%.

6. The method of claim 3, wherein said method further comprising a step of:
   decreasing said rotational speed of said disk drive when each of Pk, Pk-1, . . ., Pk-n+2, and Pk-n+1 is less than a threshold L during n consecutive units of time periods T.

7. The method of claim 6, wherein said method further comprising a step of setting Pk to be greater than said threshold L after decreasing said rotational speed.

8. The method of claim 6, wherein said method further comprising a step of setting Pk to be greater than said threshold L after decreasing said rotational speed.

9. A method for adjusting the rotational speed of a motor of a disk drive, comprising:
- calculating an error rate Ek that said drive reads data from a disk during a unit time T;
- calculating a proportion of time (Pk) which said disk drive spends reading data from said disk during said unit time T; and
- increasing said rotational speed of said disk drive when each of Pk, Pk-1 ... Pk-m+2, and Pk-m+1 is greater than a threshold H during m consecutive units of time periods T and each of said error rate Ek, Ek-1, ..., Ek-r+2, and Ek-r+1 is less than a threshold Q during each of r consecutive units of time periods T,
- wherein said error rate Ek is the average amount of Parity of Inner Code (PI) errors in every 42 error correction code blocks during said unit time T.

10. The method of claim 9, wherein said criterion Q is 100 PI errors.

11. The method of claim 9, wherein said method further comprising a step of setting Pk to be less than said threshold H after increasing said rotational speed.

12. The method of claim 9, wherein said threshold H is 90%.

13. The method of claim 9, wherein said method further comprising a step of:
- decreasing said rotational speed of said disk drive when each of Pk, Pk-1 ... Pk-n+2, and Pk-n+1 is less than a threshold L during n consecutive units of time periods T.

14. The method of claim 13, wherein said method further comprising a step of setting Pk to be greater than said threshold L after decreasing said rotational speed.

15. The method of claim 13, wherein said threshold L is 50%.

* * * * *